UNITED STATES PATENT OFFICE.

WAYNE TAYLOR AND THOMAS Y. BOSTON, OF CAVE SPRING, MISSOURI.

IMPROVEMENT IN ANTI-SPASMODIC REMEDIES.

Specification forming part of Letters Patent No. 172,060, dated January 11, 1876; application filed November 10, 1875.

*To all whom it may concern:*

Be it known that we, WAYNE TAYLOR and THOMAS Y. BOSTON, of Cave Spring, in the county of Greene and State of Missouri, have invented a new and useful Medical Compound, of which the following is a specification:

Our invention relates to a medical compound to be used as a remedy for spasms and epileptic fits; and it consists of a composition formed by dissolving in and mixing with cold water bromide of potassium, fluid extract of valerian, bromide ammonium, and cohosh.

To prepare our medicine, take one quart of water and dissolve in that, and mix therewith, the above-mentioned ingredients, in the following proportions: Bromide of potassium, six ounces; fluid extract of valerian, two ounces; bromide ammonium, one ounce; cohosh, half ounce.

The dose for children will be a tea-spoonful three times a day, and for adults a table-spoonful three times a day, until a cure has been effected.

What we claim as our invention, and desire to secure by Letters Patent, is—

A medical compound as a remedy for spasms and epileptic fits, consisting of a fluid prepared of bromide of potassium, fluid extract of valerian, bromide ammonium, cohosh, and water, mixed in the proportions substantially as described.

In testimony whereof we have signed our names to the foregoing specification in the presence of two subscribing witnesses.

WAYNE TAYLOR.
T. Y. BOSTON.

Witnesses:
F. S. HEFFERNON,
B. F. PARTRIDGE.